United States Patent
Endo et al.

(10) Patent No.: US 12,247,276 B2
(45) Date of Patent: Mar. 11, 2025

(54) COPPER POWDER, METHOD FOR MANUFACTURING COPPER POWDER, AND METHOD FOR MANUFACTURING SOLID SHAPED OBJECT

(71) Applicant: JX Nippon Mining & Metals Corporation, Tokyo (JP)

(72) Inventors: Yosuke Endo, Ibaraki (JP); Hiroyoshi Yamamoto, Ibaraki (JP); Ryo Suzuki, Tokyo (JP); Kenji Sato, Tokyo (JP)

(73) Assignee: JX Advanced Metals Corporation, Tokyo (JP)

( * ) Notice: Subject to any disclaimer, the term of this patent is extended or adjusted under 35 U.S.C. 154(b) by 826 days.

(21) Appl. No.: 16/080,887

(22) PCT Filed: Jan. 12, 2018

(86) PCT No.: PCT/JP2018/000688
§ 371 (c)(1),
(2) Date: Aug. 29, 2018

(87) PCT Pub. No.: WO2018/193671
PCT Pub. Date: Oct. 25, 2018

(65) Prior Publication Data
US 2021/0178465 A1 Jun. 17, 2021

(30) Foreign Application Priority Data
Apr. 21, 2017 (JP) .................................. 2017-084829

(51) Int. Cl.
| | | |
|---|---|---|
| B22F 1/16 | (2022.01) | |
| B22F 1/00 | (2022.01) | |
| B22F 1/05 | (2022.01) | |
| B22F 7/02 | (2006.01) | |
| B22F 9/08 | (2006.01) | |
| B22F 10/28 | (2021.01) | |
| B22F 10/34 | (2021.01) | |
| B33Y 70/00 | (2020.01) | |
| B33Y 80/00 | (2015.01) | |
| C22C 9/00 | (2006.01) | |
| B22F 12/41 | (2021.01) | |

(52) U.S. Cl.
CPC ................ *C22C 9/00* (2013.01); *B22F 1/00* (2013.01); *B22F 1/05* (2022.01); *B22F 1/16* (2022.01); *B22F 7/02* (2013.01); *B22F 10/28* (2021.01); *B22F 10/34* (2021.01); *B33Y 70/00* (2014.12); *B33Y 80/00* (2014.12); *B22F 2009/0844* (2013.01); *B22F 12/41* (2021.01); *B22F 2201/03* (2013.01); *B22F 2301/10* (2013.01); *B22F 2998/10* (2013.01)

(58) Field of Classification Search
CPC ..................................................... B22F 1/0003
See application file for complete search history.

(56) References Cited

U.S. PATENT DOCUMENTS

| | | | |
|---|---|---|---|
| 2008/0038555 A1 | 2/2008 | Sekine et al. | |
| 2015/0024120 A1* | 1/2015 | Uchida | ................... H05K 1/095 |
| | | | 252/512 |
| 2016/0332227 A1* | 11/2016 | Tsubota | ..................... C22C 9/06 |
| 2017/0225228 A1* | 8/2017 | Nagahama | ............... B22F 10/28 |
| 2019/0022750 A1* | 1/2019 | Kim | ........................... B22F 9/04 |
| 2020/0055116 A1* | 2/2020 | Yoshida | ..................... B22F 1/17 |
| 2021/0387255 A1* | 12/2021 | Katayama | ............... B22F 10/20 |

FOREIGN PATENT DOCUMENTS

| | | | |
|---|---|---|---|
| CN | 1358593 A | | 7/2002 |
| CN | 103801704 A | | 5/2014 |
| CN | 204018727 U | | 12/2014 |
| CN | 104325136 A | | 2/2015 |
| CN | 104874806 A | | 9/2015 |
| CN | 105880594 A | | 8/2016 |
| CN | 106623953 A | * | 5/2017 |
| JP | 2014156634 A | * | 8/2014 |
| JP | 2015183255 A | | 10/2015 |
| JP | 201736508 A | | 2/2017 |
| KR | 100819517 B1 | | 4/2008 |
| WO | 2016052373 A1 | | 4/2016 |
| WO | 2016185966 A1 | | 11/2016 |
| WO | WO-2018181482 A1 | * | 10/2018 |
| WO | WO-21019017467 A1 | * | 1/2019 |

OTHER PUBLICATIONS

English translation of CN 106623953 (originally published May 10, 2017), obtained from PE2E search.*
International Search Report for PCT/JP2018/000688 dated Apr. 21, 2017, 8 pages.
Chen, et al., "Study on laser absorptivity of metal material", Journal of Applied Optics, vol. 29, No. 5, dated Sep. 2008, pp. 793-798.
CN Second Office Action dated Oct. 10, 2020, 6 pages.
International Preliminary Report on Patentability for PCT/JP2018/000688 from WIPO dated Oct. 31, 2019, 6 pages.
Extended European Search Report, dated Oct. 2, 2019, for Corresponding EP Application 18756385.4, 8 pages.

(Continued)

*Primary Examiner* — George Wyszomierski
(74) *Attorney, Agent, or Firm* — Faegre Drinker Biddle & Reath LLP

(57) ABSTRACT

The present invention provides a copper powder which is capable of fusion bonding with a low energy laser by enabling heat to be efficiently inputted with a high absorption rate for laser irradiation and has high convenience in handling, and provides a method for manufacturing the copper powder. One embodiment of the present invention is a copper powder, having an absorption rate for light having a wavelength $\lambda=1060$ nm of 18.9% to 65.0%, and an index, which is indicated by (the absorption rate for light having a wavelength $\lambda=1060$ nm)/(an oxygen concentration), of 3.0 or more.

18 Claims, No Drawings

(56) References Cited

OTHER PUBLICATIONS

Folio, F. et al., "Centrigual Atomisation of Metallic Alloys in Inductive Plasma Onto Cooled Disc", Powder Metallurgy, Maney Publishing, London, GB, vol. 43, No. 3, dated Jan. 1, 2000, pp. 245-252.

Special Issue 2—3D Printers; Attractive! Edition; "Design and Manufacturing Solution Exhibition" Report; Various Shaping Materials such as Resin, Paper and Metal; Nikkei Manufacturing, published by Nikkei BP, issue date: Aug. 1, 2013, pp. 64-68.

\* cited by examiner

COPPER POWDER, METHOD FOR MANUFACTURING COPPER POWDER, AND METHOD FOR MANUFACTURING SOLID SHAPED OBJECT

TECHNICAL FIELD

The present invention is related to a copper powder, a method for manufacturing a copper powder, and a method for manufacturing a solid shaped object. Particularly, the present invention is related to a copper powder, a method for manufacturing a copper powder, and a method for manufacturing a solid shaped object for 3D (three-dimension) printers wherein fusion bonding can be conducted with low energy laser.

BACKGROUND ART 3D printer technology is also known as AM (additive manufacturing). As a method for manufacturing a metallic 3d solid shaped object, a laminating method using EB (electron beam) or laser is well known. This is achieved by forming a metal powder layer on a table for sintering; irradiating a predetermined portion of the powder layer with a beam to sinter this portion; then, forming a new powder layer on the existing powder layer; irradiating a predetermined portion of the new powder layer with a beam to sinter this portion, and thus forming a sintered part integrated with the sintered part of the lower layer. By repeating this, 3D solid shapes are stacked one by one from the powder, and it is possible to shape complicated shapes that had been difficult or impossible to build with conventional processing methods. Through these techniques, it is possible to form directly a desired 3D solid shaped model into a metallic material based on a shape data of such as CAD (Non-Patent Document 1).

When manufacturing solid shaped object by laminating method using laser, the output power of laser is determined such that the metal powders are sufficiently sintered or fusion bonded. Here, the required energy amount of laser for sintering or fusion bonding the metal powders varies depending on the metal material. For example, metal materials with high laser reflectivity, such as copper and aluminum, are hard to absorb the energy of the laser, and therefore, in order to sinter or fusion bond the metal particles using these metal materials, it is necessary to irradiate a high energy laser. As a result, due to the high energy of the laser, there are problems such as increase in manufacturing cost, complication of the structure of the manufacturing apparatus, failure to successfully bond the metal particles and the like.

To solve the problems, Patent Documents 1 discloses a powder material used for fabrication of a three-dimensional object by selectively irradiating a thin layer of a powder material containing metal particles with a laser beam to form an object layer through sintering or fusing of the metal particles, and laminating the object layer, the powder material comprising: porous metal particles each formed from metal nanoparticles bonded each other with a binder, wherein the powder material has a BET specific surface area of $5.0 \times 10^6$ $(m^2/m^3)$ or more and $1.1 \times 10^8$ $(m^2/m^3)$ or less. According to this invention, it is possible to easily sinter or fuse metal particles included in the powder material using a low-energy laser regardless of the material constituting the powder material.

CITATION LIST

Patent Document

[Patent Document 1] WO2016/185966

Non-Patent Document

[Non-Patent Document 1] "Feature 2—3D Printer|Attracted! report of 'Design and Manufacturing Solutions Exhibition'—Diversification of molding materials such as resins, paper and metals", Nikkei Monozukuri August Issue, page 64-68 page, issued by Nikkei BP Publications, Inc. (issue date: Aug. 1, 2013)

SUMMARY OF INVENTION

Technical Problem

However, with the development and spread of 3D printers, there is an increasing demand for preparing metal powders so as to be able to produce solid shaped objects at lower cost. In particular, in a 3D printer using a YAG laser, much of the laser are reflected at the time of laser irradiation, and thus heat can not be efficiently inputted, and there is a problem that the metal powders can not be fused and can not be successfully shaped.

The present invention has been made in view of the above problems, and it is an object of the present invention to provide a copper powder for a 3D printer capable of fusion bonding with a low energy laser by enabling heat to be efficiently inputted with a high absorption rate for laser irradiation, and to provide a method for manufacturing the copper powder.

Solution to Problem

In order to solve the above technical problem, the inventors of the present invention conducted extensive research and discovered findings that the absorption rate to laser can be improved by providing a specific oxide coating on the surface by oxidizing treatment to the copper powder. Further investigation and discussion were conducted and the present invention is completed.

Based on the above findings and results, the present invention provides the following:

(1) A copper powder,
   having an absorption rate for light having a wavelength $\lambda=1060$ nm of 18.9% to 65.0%, and an index, which is indicated by (the absorption rate for light having a wavelength $\lambda=1060$ nm)/(an oxygen concentration), of 3.0 or more.
(2) The copper powder according to (1),
   wherein the oxygen concentration is 2000 wt ppm or less.
(3) The copper powder according to (1) or (2),
   having a repose angle of 20° or more and 32° or less.
(4) The copper powder according to any one of (1) to (3),
   having an average particle diameter D50 of 10 to 100 μm.
(5) The copper powder according to any one of (1) to (4),
   wherein the copper powder is for use of a 3D printer.
(6) A method for manufacturing a copper powder, comprising:
   a step of heating an atomized copper powder, which is prepared by a disk atomization method, in an oxidizing atmosphere, and thus forming a preliminary sintered body;

a step of pulverizing and sieving the preliminary sintered body.

(7) The method for manufacturing a copper powder according to (6),
wherein the temperature of the oxidizing atmosphere is 120° C. to 200° C.

(8) A method for manufacturing a solid shaped object, comprising:
irradiating a thin layer of the copper powder manufactured by the method according to (6) or (7) with laser light to form a shaped body layer wherein the copper powder is sintered or fusion bonded;
laminating a plurality of the shaped body layers to form a solid shaped object.

Effect of Invention

According to the present invention, the copper powder is capable of fusion bonding with a low energy laser by enabling heat to be efficiently inputted with a high absorption rate for laser irradiation.

DESCRIPTION OF EMBODIMENTS (Copper Powder)

As a copper powder, any copper powder manufactured with publicly known method may be used. It is common to use copper powder manufactured by a dry method typified by an atomization method which is industrially excellent in manufacturing cost as long as it has a particle size of several μm or more, but copper powder manufactured by wet method such as reduction method also may be used. The purity (excluding gas components of oxygen, carbon, nitrogen, hydrogen, sulfur and chlorine) is desirably 99.9% (3N) or more, more desirably 99.99% (4N) or more. Further, the oxygen concentration in the raw material copper powder is preferably 500 wt ppm or less, and more preferably 300 wt ppm or less. This is because the surface oxide layer proposed in this embodiment is liable to float on the surface layer of the molded product during melting by a laser or is easy to be detached from the modeled object due to the impact of a laser, whereas when oxygen exists inside the copper powder, there is a high possibility that the oxygen be encapsulated in the shaped object, and this may adversely affect the physical properties of the shaped object. In order to realize this oxygen concentration, it is preferable to use a disk atomization method. When using a gas atomization method, there is a high possibility of enclosing oxygen contained in the gas used for spraying, and the oxygen concentration often exceeds 500 wt ppm.

From the viewpoint of facilitating the sintering or fusion bonding of the copper powder and facilitating the shaping with a laser having a lower energy more easily, it is essential that the absorption rate for light having a wavelength $\lambda=1060$ nm, which is a light generally used for the YAG laser, is 18.9% to 65.0%, respectively. If the absorption rate is less than 18.9%, it is necessary to use a large amount of energy for shaping, and the manufacturing cost increases. On the other hand, if the absorption rate exceeds 65.0%, the degree of increase in the absorption effect due to the oxidation time becomes small, and inconveniences such as an increase in cost for oxidation and generation of slag at the time of shape may occur.

Furthermore, considering that the greater the absorption rate with respect to the oxygen concentration is advantageous in solving the problems of the present invention, the index indicated by absorption rate/oxygen concentration is defined as 3.0 or more. The index is defined by the following formula:

$$\text{absorption rate/oxygen concentration} = \text{(the absorption rate for light having a wavelength } \lambda=1060 \text{ nm)}/\text{(an oxygen concentration)}*100$$

The unit of absorption rate is % and the unit of oxygen concentration is wt ppm. When the index indicated by absorption rate/oxygen concentration falls below 3.0, it is necessary to raise the oxygen concentration excessively in order to raise the absorption rate for light having a wavelength $\lambda=1060$ nm, so that there is a possibility that oxide slag may be generated during shaping.

The concentration of oxygen contained in the copper powder can be 2000 wt ppm or less. As mentioned above, in order to facilitate shaping with a laser having a lower energy, it is necessary to make the absorption rate for light having a wavelength $\lambda=1060$ nm to be 18.9% to 65.0%, and since metal oxide usually has a higher absorption rate than metal itself, it is conceivable to provide an oxide coating on the surface of the copper powder. In this case, when the oxygen concentration is 2000 wt ppm or less, it is possible to suppress defects such as generation of slag during shaping.

Further, it is preferable that the repose angle of the copper powder is 20° or more and 32° or less. Because of the nature of the copper powder, the repose angle is rarely less than 20°, so hereinafter the case where it exceeds 32° is explained. When it exceeds 32°, there arises a problem that uniform lamination can not be performed when stacking copper powder during shaping. Generally, when copper powder is heated in a laminated state or a filled state, particles are necked with each other. Fluidity deteriorates when necking occurs. Therefore, in the present embodiment, an annealing condition for suppressing the degree of necking is set and a sieving process is performed after pulverizing of the preliminary sintered body, and the repose angle is kept in the range of 20° to 32° to maintain fluidity.

The average particle diameter D50 of the copper powder is preferably 10 to 100 μm. When the average particle diameter D50 is set to 10 μm or more, the powder does not easily fly at the time of shaping, and the handling of the powder becomes easy. Further, by setting the average particle diameter D50 to 100 μm or less, it becomes possible to produce a higher-definition solid shaped object.

Inevitable impurities may be contained in the copper powder, but impurities may be contained as long as they does not affect the properties required for the copper powder. In this case, the concentration of inevitable impurities (excluding the gas component) is preferably 0.01% by mass or less from the viewpoint of efficiently fusion bonding the copper powder.

[Processing Method of Copper Powder]

In order to make the absorption rate for light having a wavelength $\lambda=1060$ nm to be 18.9% to 65.0% and make the index represented by the absorptance/oxygen concentration to be 3.0 or more, it is conceivable to provide an oxide coating by heating the atomized powder of copper in an oxidizing atmosphere, wherein the atomized powder is prepared by a disk atomization method. The oxidizing atmosphere means an atmosphere containing oxygen, which may be the atmosphere or artificially supplied oxygen, but in view of mass production cost, it is preferably the atmosphere.

By performing the above process, the copper powder reacts with oxygen, and an oxide coating is formed on the surface of the powder. The extent of formation of the oxide coating may be such that the absorption rate for light having a wavelength λ=1060 nm of the copper powder is 18.9% to 65.0%, and preferably the oxygen concentration in the copper powder becomes 2000 wt ppm or less. Specifically, in the case where the heating treatment is performed in the atmosphere, the atmosphere temperature is adjusted to 120° C. to 200° C., and the heating time is further adjusted according to the temperature condition, for example, heating at 120° C. to less than 150° C. for 2 to 74 hours, or heating at 150° C. or higher and lower than 200° C. for 2 to 8 hours. If the heating temperature is lower than 120° C., formation of the oxide coating is not preferable because it is too slow. When the heating temperature exceeds 200° C., it is not preferable because it is difficult to control the degree of oxidation. On the other hand, if the heating time is less than 2 hours, the oxide coating is insufficient, and if it exceeds 74 hours, the necking of the copper powder excessively occurs undesirably. In the present embodiment, in order to suppress the cost, oxidation is performed in the atmosphere, but in the case where the oxygen amount increases, it is advisable to adjust the temperature, the time, etc.

After heating the atomized powder in an oxidizing atmosphere, the obtained preliminary sintered body is pulverized and sieved, whereby copper powder necessary for various 3D printers can be obtained. Then, a thin layer of this copper powder is irradiated with a laser beam (in the case of a YAG laser, by irradiating a laser beam having a wavelength λ=1060 nm), a shaped layer wherein the copper powder is sintered or fusion bonded, and a solid shaped object can be manufactured by laminating a plurality of the shaped body layers.

EXAMPLES

Hereinafter, the present invention will be specifically described using examples and comparative examples. However, The descriptions of the following examples and comparative examples are merely specific examples for facilitating understanding of the technical contents of the present invention and the technical scope of the present invention is not limited by these specific examples.

(Preparing of Example 1 to 7 and Comparative Example 1 to 11)
[Copper Powder]
As copper powder for each of Example 1 to 7 and Comparative Example 1 to 11, copper powder prepared by a disk atomization method was used.
[Processing Method for Copper Powder]
The copper powder prepared by the disk atomization method was subjected to a heat treatment under the temperature and time conditions shown in Table 1 in the atmosphere.
(Evaluation of Example 1 to 7 and Comparative Example 1 to 11)
[Absorption Rate for Light with a wavelength λ=1060 nm]
Absorption rate for light having a wavelength λ=1060 nm was measured with a U-4100 spectrophotometer manufactured by Hitachi High-tech Science Corporation.
[Oxygen Concentration]
The oxygen concentration was measured by inert gas melting method with TCH 600 manufactured by LECO Corporation.
[Repose Angle]
The repose angle was measured by the method described in JIS R 9301-2-2.
[Average Particle Diameter D50]
The average particle diameter D50 (volume basis) was measured using the following apparatus.
Manufacturer: Spectris Co., Ltd. (Malvern Division)
Apparatus name: Dry particle image analyzer Morphologi G3

TABLE 1

| | Annealing temperature (°C.) | Heating time (h) | Heating atmosphere | Preparing method of the raw copper powder | Raw copper powder particle diameter D50 (μm) | Oxygen concentration in the raw copper powder (wt ppm) | Oxygen concentration after oxidation treatment (wt ppm) | absorption rate (λ = 1060 nm) (%) | absorption rate/ oxygen concentration ×100 | repose angle (°) |
|---|---|---|---|---|---|---|---|---|---|---|
| Example 1 | 120 | 2 | the atmosphere | disk atomization | 40 | 150 | 180 | 18.9 | 10.5 | 22.1 |
| Example 2 | 120 | 5 | the atmosphere | disk atomization | 40 | 150 | 200 | 19.1 | 9.6 | 23.5 |
| Example 3 | 120 | 8 | the atmosphere | disk atomization | 40 | 150 | 220 | 19.3 | 8.8 | 24.1 |
| Example 4 | 150 | 2 | the atmosphere | disk atomization | 40 | 150 | 370 | 23.3 | 6.3 | 25.5 |
| Example 5 | 150 | 5 | the atmosphere | disk atomization | 40 | 150 | 690 | 43.5 | 6.3 | 27.1 |
| Example 6 | 150 | 8 | the atmosphere | disk atomization | 40 | 150 | 850 | 52.8 | 6.2 | 29.1 |
| Example 7 | 200 | 2 | the atmosphere | disk atomization | 40 | 150 | 1,900 | 56.1 | 3.0 | 32.0 |
| Comparative Example 1 | — | — | — | disk atomization | 40 | 150 | 150 | 17.5 | 11.7 | 22.0 |
| Comparative Example 2 | 100 | 2 | the atmosphere | disk atomization | 40 | 150 | 150 | 17.5 | 11.7 | 22.1 |
| Comparative Example 3 | 100 | 5 | the atmosphere | disk atomization | 40 | 150 | 150 | 17.5 | 11.7 | 22.2 |
| Comparative Example 4 | 100 | 8 | the atmosphere | disk atomization | 40 | 150 | 150 | 17.5 | 11.7 | 22.4 |
| Comparative Examples | 150 | 74 | the atmosphere | disk atomization | 40 | 150 | 3,400 | 63.4 | 1.9 | 31.0 |
| Comparative Example 6 | 200 | 5 | the atmosphere | disk atomization | 40 | 150 | 4,700 | 64.1 | 1.4 | 32.0 |
| Comparative Example 7 | 200 | 8 | the atmosphere | disk atomization | 40 | 150 | 5,900 | 65.0 | 1.1 | 32.5 |
| Comparative Example 8 | 250 | 2 | the atmosphere | disk atomization | 40 | 150 | 10,000 | 67.2 | 0.7 | 33.0 |
| Comparative Example 9 | — | — | — | gas atomization | 40 | 600 | 600 | 17.5 | 2.9 | 24.5 |

TABLE 1-continued

|  | Annealing temperature (°C.) | Heating time (h) | Heating atmosphere | Preparing method of the raw copper powder | Raw copper powder particle diameter D50 (μm) | Oxygen concentration in the raw copper powder (wt ppm) | Oxygen concentration after oxidation treatment (wt ppm) | absorption rate (λ = 1060 nm) (%) | absorption rate/ oxygen concentration ×100 | repose angle (°) |
|---|---|---|---|---|---|---|---|---|---|---|
| Comparative Example 10 | 150 | 2 | the atmosphere | gas atomization | 40 | 600 | 850 | 23.4 | 2.8 | 26.2 |
| Comparative Example 11 | 200 | 2 | the atmosphere | gas atomization | 40 | 600 | 2,400 | 54.7 | 2.3 | 33.1 |

According to Example 1 to 7, it is possible to increase the thickness of the oxide coating on the surface of the copper powder by raising the temperature of heating or prolonging the heating time, and accordingly the absorption rate for light having a wavelength λ=1060 nm also can be improved. Also, the absorption rate is large compared to the oxygen concentration, and the oxygen concentration is also in the range where there is no influence upon shaping. Furthermore, the repose angle falls within the range of 20° to 32°, and handling convenience is also high.

In Comparative Example 1, no heat treatment was performed, and the absorption rate for light having a wavelength λ=1060 nm was only 17.5%.

In Comparative Example 2 to 4, heat treatment was performed, but since the degree of treatment was insufficient, no increase in absorption rate for light having a wavelength λ=1060 nm was observed.

In Comparative Example 5 to 8, although the absorption rate for light having a wavelength λ=1060 nm increased, the oxygen concentration was as high as not less than 2000 wt ppm, and there was a possibility that oxide slag may be generated at the time of shaping. Also, the index indicated by absorption rate/oxygen concentration is less than 3.0.

Comparative Example 9 to 11 are the results in the case of using gas atomized powder. In gas atomization, a large amount of gas was blown and atomized, so that metal powder was produced in a form involving trace oxygen contained in the gas, and the oxygen concentration was as high as 600 wt ppm at the stage before the oxidation treatment. In other words, compared with the embodiment made by using the disk atomized powder, even if the oxygen concentration is the same, the thickness of the oxide coating affecting laser light absorption is small. Therefore, the index indicated by absorption rate/oxygen concentration is lower than 3.0. In addition, since the sphericity is generally higher in the disk atomization method, in Comparative Example 9 to 11 produced by the gas atomizing method, compared with Comparative Example 1, Examples 5 and 7 which are processed under the same conditions, repose angle has become large, and fluidity has become low. Therefore, it is easier to manufacture copper powder satisfying the conditions of the present invention by using disk atomized powder than using gas atomized powder.

INDUSTRIAL APPLICABILITY

According to the present invention, it is possible to provide a copper powder which is capable of fusion bonding with a low energy laser by enabling heat to be efficiently inputted with a high absorption rate for laser irradiation, and has high convenience in handling, and possible to provide a method for manufacturing the copper powder. Therefore, when used for a 3D printer, it is also possible to reduce the manufacturing cost of the solid shaped object.

The invention claimed is:

1. A copper powder consisting of copper and inevitable impurities, the copper powder having an outer surface, and an oxide coating formed on the entire outer surface of the powder, and an absorption rate for light having a wavelength λ=1060 nm of 18.9% to 65.0%, and an index, which is indicated by (the absorption rate percentage (%) for light having a wavelength λ=1060 nm/an oxygen concentration (wtppm))*100, of 3.0 or more.

2. The copper powder according to claim 1,
wherein the oxygen concentration is 2000 wt ppm or less.

3. The copper powder according to claim 2,
having a repose angle of 20° or more and 32° or less.

4. The copper powder according to claim 3,
wherein the copper powder is for use of a 3D printer.

5. The copper powder according to claim 2,
having an average particle diameter D50 of 10 to 100 μm.

6. The copper powder according to claim 5,
wherein the copper powder is for use of a 3D printer.

7. The copper powder according to claim 2,
wherein the copper powder is for use of a 3D printer.

8. The copper powder according to claim 1,
having a repose angle of 20° or more and 32° or less.

9. The copper powder according to claim 8,
having an average particle diameter D50 of 10 to 100 μm.

10. The copper powder according to claim 9,
wherein the copper powder is for use of a 3D printer.

11. The copper powder according to claim 8,
wherein the copper powder is for use of a 3D printer.

12. The copper powder according to claim 1,
having an average particle diameter D50 of 10 to 100 μm.

13. The copper powder according to claim 12,
wherein the copper powder is for use of a 3D printer.

14. The copper powder according to claim 1,
wherein the copper powder is for use of a 3D printer.

15. A method for manufacturing the copper powder according to claim 1, comprising:
a step of heating an atomized copper powder, which is prepared by a disk atomization method, in an oxidizing atmosphere, and thus forming a preliminary sintered body;
a step of pulverizing and sieving the preliminary sintered body.

16. The method for manufacturing a copper powder according to claim 15,
wherein the temperature of the oxidizing atmosphere is 120° C. to 200° C.

17. A method for manufacturing a solid shaped object, comprising:
irradiating a thin layer of the copper powder manufactured by the method according to claim 16 with laser light to form a shaped body layer wherein the copper powder is sintered or fusion bonded;

laminating a plurality of the shaped body layers to form a solid shaped object.

18. A method for manufacturing a solid shaped object, comprising:

irradiating a thin layer of the copper powder manufactured by the method according to claim 15 with laser light to form a shaped body layer wherein the copper powder is sintered or fusion bonded;

laminating a plurality of the shaped body layers to form a solid shaped object.

* * * * *